United States Patent Office 3,729,437
Patented Apr. 24, 1973

3,729,437
PROCESS FOR THE PRODUCTION OF CONCENTRATED AQUEOUS EMULSIONS OR INSOLUBLE LIQUID, PASTY OR SOLID ORGANIC OR INORGANIC SUBSTANCES
Willy Bernheim, Diedorf, near Augsburg, and Hans Deiner, Neusass, near Augsburg, Germany, assignors to Chemische Fabrik Pfersee G.m.b.H., Augsburg, Germany
No Drawing. Filed Dec. 21, 1970, Ser. No. 100,431
Claims priority, application Germany, Dec. 27, 1969, P 19 65 068.1
Int. Cl. B01j 13/00
U.S. Cl. 260—29.2 EP          8 Claims

ABSTRACT OF THE DISCLOSURE

Concentrated aqueous emulsions or dispersions of water-insoluble liquid, pasty or solid organic or inorganic substances are prepared with emulsifiers which are produced by the reaction of:
(a) about 1 mole of urea, guanidine, derivatives of guanidine or the products of the decomposition of guanidine derivatives; with
(b) about 0.25–2.5 moles of an epoxy compound containing in the molecule on the average more than one epoxy group; and
(c) about 0.1–2 moles of an amine of the general formula

wherein
$R_1$ represents an alkyl group having 2–4 carbon atoms or an alkanol group of 2–5 carbon atoms,
$R_2$ and $R_3$ represent hydrogen, an alkyl group having 1–4 carbon atoms, or an alkanol group having 2–5 carbon atoms,
wherein $R_2$ and/or $R_3$ represent identical or different groups, and at least two reactive hydrogen atoms are present in the molecule of the general formula, under heating, preferably in the presence of water-miscible solvents boiling at more than about 50° C.

CROSS REFERENCES TO RELATED APPLICATIONS

Applicants claim priority under 35 U.S.C. 119 for application P 19 65 068.1, filed Dec. 27, 1969 in the Patent Office of the Federal Republic of Germany.

Incorporated by reference in the present application is the copending disclosure of Bernheim et al. Ser. No. 54,590, filed July 13, 1970 in the U.S. Patent Office and having the title "Water-Soluble or Inherently Water-Dispersible Condensation Products Which Gross Link with Heating and the Use of These Condensation Products as Curing Agents for Organo Polysiloxanes."

BACKGROUND OF THE INVENTION

It has long been known to emulsify fats and oils with aqueous solutions of preliminary condensates of formaldehyde. However, these emulsions exhibit little stability, even though considerable quantities of condensation products have been added. Furthermore, the emulsification of paraffin with solutions of these preliminary formaldehyde condensates or the water-soluble salts thereof is known, for example, from British Pat. 596,154 and German Pat. 956,990. However, these emulsifiers of the prior art have the disadvantage that it is possible to emulsify only once or twice the amount by weight of paraffin or wax for a given quantity of preliminary formaldehyde condensate.

Further, the emulsification of organopolysiloxanes has been known for a long time. However, the conventional emulsifiers exhibit the disadvantage that because of their surface active properties, they impair the hydrophobic effect of the silicones, especially in the treatment of fibrous materials. Besides, some of these emulsifiers are weakly alkaline and thereby promote the decomposition of the hydrogen polysiloxanes. Others, in turn, cause changes in hand on the treated material. Finally, other emulsifiers exhibit a limited usefulness in that the emulsions obtained are incompatible with the metallic salts required as curnig agents for the siloxanes. In this case, increases in the particle size of the emulsions occur which then cause non-uniformities in the hydrophobic effects and spots on the treated materials. Also, the rub fastness of dyes, especially on polyester fibers, leaves much to be desired after treatment with conventional silicone emulsions.

Furthermore, the emulsification of water-insoluble, liquid to solid organic or inorganic substances with the aid of water-soluble condensation products produced by the reaction of epoxy compounds with polyamines, wherein preferably 1.5–4 reactive hydrogen atoms are present per epoxy group, is also included in the state of the art. The emulsions prepared thereby exhibit the disadvantage that fibrous materials treated therewith tend more or less strongly toward yellowing, depending on the amine content. Thus, the use of these compounds in connection with textiles can result in difficulties, at least with respect to white goods. A further disadvantage of the emulsions prepared with the conventional emulsifiers resides in that the fibrous materials treated with these emulsions tend to develop more or less strong odors after the condensation of the textile materials, likewise in dependence on the amine content, especially in the case where synthetic resins are employed along with the emulsifiers. The odor produced in this connection is strongly dependent on the condensation temperature and the ventilation of the drying units, so that fibrous materials treated with the conventional emulsions must be subjected to a precise secondary treatment.

SUMMARY OF THE INVENTION

According to the present invention a process for the production of concentrated aqueous emulsions or dispersions of water-insoluble liquid, pasty, or solid organic or inorganic substances has now been discovered, by means of which the disadvantages of the prior art are avoided. This process is characterized in that the water-insoluble substances are emulsified with the use, as emulsifiers, of water-soluble or water-self-dispersing condensation products which cross-link under heat, which products are produced by the reaction of
(a) about 1 mole of urea, guanidine, derivatives of guanidine or the products of the decomposition of guanidine derivatives, with
(b) about 0.25–2.5 moles of an epoxy compound containing in the molecule on the average more than one epoxy group; and
(c) about 0.1–2 moles of an amine of the general formula

wherein
$R_1$ represents an alkyl group having 2–4 carbon atoms or an alkanol group of 2–5 carbon atoms,
$R_2$ and $R_3$ represent hydrogen, an alkyl group having 1-4 carbon atoms, or an alkanol group having 2-5 carbon atoms, wherein $R_2$ and/or $R_3$ represent identical or different groups, and at least two reactive hydrogen atoms are present in the molecule, under heating, preferably in the presence of water-miscible solvents boiling at more than about 50° C.

The condensation products employed as the emulsifiers in the process of this invention are normally prepared by heating 1 mole of component (a) together with 0.25–2.5 moles, preferably 0.5–1.5 moles of the epoxy compound (b), 0.1–2 moles, preferably 0.3–1.2 moles of the amine (c), and the water-miscible solvent boiling at more than about 50° C., under agitation at about 60–140° C., for approximately 10–240 minutes. After the viscosity of the mixture has strongly increased, the reaction is stopped by the addition of a volatile acid, such as hydrochloric acid or a lower carboxylic acid, such as formic or acetic acid, and water. The time of bringing the reaction to a halt is quickly determined in a simple manner by solution experiments with small samples of the mixture. For this purpose, a sample of the reaction product is introduced into approximately 2 percent acetic acid. The reaction is terminated as soon as a clear to opalescent solution has been formed. By the addition of the volatile acid and the water, an about 5–20 percent colorless to yellowish solution of the condensation product is produced having a pH of about 4–6.

Specific examples of the volatile acids are hydrochloric acid, formic acid, acetic acid, hyrobromic acid and propionic acid.

The solvent serves as a diluent during the reaction and is usually added in amounts of 20–35 percent, based on the mixture of components (a), (b), and (c). Preferred solvents employed in this connection are aliphatic monohydric alcohols of 2–5 carbon atoms. However, other solvents boiling at above about 50° C. are likewise suitable, such as ketones, polyalcohols, esters, and ethers, as long as they exhibit sufficient solubility in water.

The specific examples of the solvent which is water-miscible and boils at above approximately 50° C. include ethyl alcohol, propyl alcohol, butyl alcohol, pentyl alcohol, methyl ethyl ketone, glycol, glycol monoacetate, glycol monoethyl ether, methylacetate, butyleneglycol, glycoldiacetate, glycol dimethyl ether, propanediol-(1,2), glycerin and diethylene glycol.

The concentration of the organic or inorganic substances in the total dispersion is 10 to 65 percent by weight and preferably 25 to 50 percent by weight.

The concentration of the emulsifier in the total dispersion is 0.5 to 10 percent by weight, and preferably 1.5 to 5 percent by weight. Naturally higher quantities of emulsifier can also be applied without fearing a negative influence to the desired effects.

DESCRIPTION OF THE PREFERRED EMBODIMENTS

As the starting component (a) for the condensation products employed as emulsifiers in the process of this invention, suitable are urea, guanidine, the derivatives thereof, or the products thereof obtained by heating urea or guanidine. Examples of such compounds which can be set forth are, in addition to urea and guanidine, also acetoguanidine, cyanamide (obtained during the heating of urea in the presence of thionyl chloride), dicyandiamide, melamine, alkyl and aryl guanamines (obtained, inter alia, during the heating of the corresponding guanidine salts), such as benzo-, aceto-, butyro-, cocoanut-, and stearoguanamine, ethylene urea, propylene urea and biuret. Among this group of compounds, preferred substances are dicyandiamide, cyanamide, and aryl or alkyl guanamines.

The derivatives of urea according to the invention include thiourea, ethylene urea, propylene urea, dihydroxy ethylene urea, oxypropylene urea, N-methylurea and N,N'-diethyl urea.

Guanidine derivatives according to the invention include acetoguanidine and aminoguanidine.

Products obtained by heating urea according to the invention include biuret, cyanamide, dicyandiamid and melamine.

Products obtained by heating guanidine according to the invention include alkyl and aryl guanamines, such as benzo-, aceto-, butyro-, cocoanut-, and stearoguanamine.

As compounds (b) which contain, on the average, more than one epoxy group in the molecule, the glycide ethers of polyhydric aliphatic alcohols are employed, such as ethylene glycol, diethylene glycol, propylene glycol, butylene glycol, glycerin, 1,2,3-trihydroxybutane, triethylene glycol, and generally polyalkylene glycols having a molecular weight of up to about 300, or of polyphenols, such as pyrocatechol, resorcinol, hydroquinone, 1,4 - dihydroxynaphthalene, 4,4' - dihydroxydiphenylmethane, or 4,4'-dihydroxydiphenylpropane. Furthermore, the glycide esters of aliphatic or aromatic dicarboxylic acids can be employed, e.g. adipic acid, sebacic acid, and terephthalic acid. Mixtures of glycide ethers and glycide esters can likewise be employed. In addition thereto, the epoxy compounds of organopolysiloxanes can be very advantageously utilized; in this connection, especially worth mentioning are the glycide ethers of polysiloxanes wherein more than one glycide ether group is bound by way of short chain alkylene groups. The glycide ether groups are preferably positioned at the end of the molecule. Such epoxy compounds of organopolysiloxanes are described, for example in German Pat. 1,061,321.

Specific examples of the compounds having more than 1 epoxy group in the molecule according to the invention include 4,4'-dihydroxydiphenylpropane diglycidyl ether, diglycidyl ether of polyethylene glycol having a M.W. of 200, glycerine diglycidyl ether having a M.W. of about 204, glycidyl ether of ethylene glycol having an epoxy number of 0.57, glycidyl ether of resorcinol having an epoxy number of 0.8, an organopolysiloxane diglycidyl ether of the formula

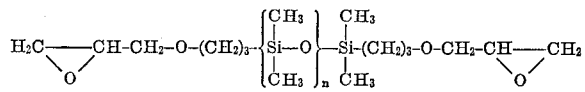

wherein $n$, on the average, is about 10 and the epoxy number is 0.193, glycidyl ether of 4,4'-dihydroxydiphenylmethane having an epoxy number 0.43, adipic acid glycidyl ester having an epoxy number of 0.5, 1,2,3-trihydroxybutane diglycidyl ether, glycidyl ether of butandiol-(1,4) having an epoxy number of 0.85, glycidyl ether of diethylene glycol having an epoxy number of 0.77, glycidyl ether of pyrocatechol having an epoxy number of 0.67, glycidyl ether of 1,4-dihydroxynaphthalene having an epoxy number of 0.68, terephthalic acid glycidyl ester having an epoxy number of 0.6.

For the condensation products employed as emulsifiers in the process of this invention, the amines (c) exhibit the general formula

wherein $R_1$ is an alkyl group of 2–4 carbon atoms or an alkanol group of 2–5 carbon atoms, and $R_2$ as well as $R_3$ are hydrogen, an alkyl group of 1–4 carbon atoms, or an alkanol group of 2–5 carbon atoms, wherein $R_2$ and/or $R_3$ represent identical or different groups and at least two reactive hydrogen atoms are present in the molecule. Examples of such amines according to the invention are: triethanolamine, triisopropanolamine, N-butyl- and N-methyldiethanolamine, diethanolisopropanolamine, N-ethylisopropanolamine, N-methylethanolamine, N-propylisopropanolamine, monoethanolamine, monoisopropanolamine, butylamine, and 3-amino - 1 - propanol. Especially suitable in the present process are the trialkanol- or alkyldialkanolamines.

In accordance with the process of the present invention, a great variety of water-insoluble liquid, pasty or solid inorganic or organic substances can be emulsified, depending upon whether the emulsions prepared according to the invention are employed for the treatment of fibrous materials to render them flameproof, oil- and water-repellent, bacteriostatic, nonslipping, or rotproof, or whether finishing agents or dyes are to be applied with the emulsions obtained according to the invention. Suitable finishing agents are oily and fatty substances, e.g. saponifiable fats, oils, waxes, the free acids thereof, cellulose derivatives, such as water-insoluble cellulose ethers or esters, or polymeric compounds, such as polyethylenes, higher polyvinyl alcohols, the esters thereof, polyvinyl chloride, and polyacrylic acid esters, as well as copolymers of the above-mentioned polymers; and for dyeing purposes, the corresponding pigment dyes of an organic or inorganic character are utilized. For flame-proofing treatments, chlorinated paraffins, chlorinated rubber and/or antimony oxide are employed, and for the rotproofing treatment, pentachlorophenol esters of higher carboxylic acids are emulsified, whereas for the bacteriostatic treatment, for example, chlorinated phenols or their derivatives are utilized, such as, for example, the 2,4,4'-trichloro-2'-hydroxydiphenyl ether. In order to conduct nonslip treatments which are of importance for various textiles, finely divided $SiO_2$ dispersions are prepared, for example.

Particular examples of the water-insoluble liquid, pasty or solid inorganic or organic substances that are emulsified according to the present invention include; methyl hydrogen polysiloxane; copolymers of methyl hydrogen siloxane and dimethyl siloxane; paraffin; montanic acid and montan waxes; chlorinated paraffin; chlorinated rubber; antimony oxide; polyethylene wax having a molecular weight about 2100; 2,4,4'-trichlor-2'-hydroxydiphenyl ether; silicone dioxide having a low particle size; cellulose acetate; pentachlorophenol-lauric acid ester; linseed oil; reaction product of N-ethyl-N-$\beta$-hydroxy-ethyl-perfluoroctane sulfonic acid amide and triphenyl methane-4,4',4''-triisocyanate; different water-insoluble solvents, such as tetrachloroethylene and toluene.

Also the oil-proofing of, in particular, textiles and paper plays an important part. For this purpose, compounds containing perfluoralkyl groups are employed, such as, for example, homo- and copolymers of the acrylic or methacrylic acid esters of N-alkyl-perfluoralkanesulfon-amidoalkanols or compounds as described, for example, in U.S. Pat. 3,380,943, British Pat. 999,795 and German published application 1,469,283.

The compiunds containing perfluoralkyl-groups are for example organosoluble reaction products from (a) one mole of an aromatic alicyclic or aliphatic polyisocyanate with at least two isocyanate groups; (b) about 0.3–0.6 mole per isocyanate group of a compound having the formula

$$R_fSO_2NR_1R_2$$

wherein $R_f$ is a perfluoralkyl group with at least 4 carbon atoms; $R_1$ is hydrogen or an aliphatic group with at most 6 carbon atoms; and $R_2$ is hydrogen or an $\beta$-oxyalkyl group with 2–5 carbon atoms; and (c) about 0.1 to 0.5 mole per isocyanate group of a compound having the formula

$$R_3X$$

wherein $R_3$ is a possibly branched aliphatic hydrocarbon group with more than 12 carbon atoms and X is a hydroxyl, carboxyl, carboxylic acid amide or amino group.

However, the process of the present invention is of paramount importance for the preparation of emulsions employed for imparting water repellency. In this connection, the water-repellency treatment is of interest, above all, for textiles. The process of the present invention makes it possible to convert paraffin hydrocarbons and waxes, as well as organopolysiloxanes into stable emulsions. In connection with the paraffin emulsions produced thereby, containing, e.g. 20 percent of paraffin and 2 percent of an emulsifier employed according to this invention, it is particularly remarkable that they result in excellent water-repellent effects without the addition of curing agents or adjuvants. The effects can be still further improved by the addition of small amounts of cross-linking preliminary synethetic resin condensates, for example 5–15 g. of a methylol compound of ethylene urea and also the washfastness of the products thus obtained can thereby be additionally increased.

In accordance with the process of this invention, organopolysiloxanes are especially preferably emulsified. Suitable organopolysiloxanes are dialkyl, alkyl hydrogen polysiloxanes and mixtures thereof. Especially preferably employed are methyl hydrogen polysiloxanes and the mixtures thereof with dimethyl polysiloxanes.

Specific examples of the organopolysiloxanes according to the invention include methyl hydrogen polysiloxanes, ethyl hydrogen polysiloxanes, dimethyl polysiloxanes, diethylpolysiloxanes and mixtures of these polysiloxanes.

The water-repellent treatment can, of course, also be combined with a treatment imparting oil-repellency.

The water-soluble or water-self-dispersing condensation products, cross-linking under heat, which are employed in accordance with this invention are distinguished by an extremely strong emulsifying action. Thus, it is possible to process, with these condensation products, about 6 to 20 times the amount of the above-mentioned water-insoluble substances into very high grade, stable emulsions or dispersions.

The emulsions of the above-described water-insoluble substances are produced by intimately mixing these substances with the aqueous solution of the emulsifier, optionally in a solution, wherein preferably hydrocarbons or halogenated hydrocarbons are employed as the solvents, and, depending on the state of aggregation (physical condition) of the water-insoluble compound, at normal to slightly elevated temperature. The thus-obtained preliminary emulsion is mechanically homogenized in a conventional manner. This homogenization is preferably conducted in a high pressure homogenizer, wherein the preliminary emulsion is forced, at pressure of 200–300 atmospheric excess pressure, through extremely narrow slots and is expanded at the same time. In this connection, it is advisable to adjust the emulsion thus produced to be weakly acidic, by the addition of acids, in order to ensure a safe further processing. The concentrated emulsions obtained exhibit, depending on the emulsified substance and the purpose for which they are employed, approximately 15–50 percent of emulsified water-insoluble substance, and can be diluted with water in any desired proportion.

The emulsions prepared according to the invention are employed for a great variety of purposes, depending on the emulsified substance. Thus, they are suitable, for example, as coatings, adhesives for molding compositions, or for the treatment of fibrous materials, such as textiles, paper, and leather. The condensation products employed as the emulsifiers exhibit the adavntage that they are self-hardening, i.e., that the emulsified substances become resistant against the attack of water and solvents by simple heating. Furthermore, the condensation products of this invention exhibit the advantage over conventional emulsifiers that the treated fibrous substances do not show the slightest yellowing; rather, the whiteness of the thus-treated materials remains unchanged. Also, no unpleasant odor occurs when using these condensation products as emulsifiers, after the fibrous materials have been treated therewith, since the condensation products employed in this connection practically do not contain any hydrogen bound to nitrogen. Furthermore, it is an advantageous feature in the emulsification of siloxanes that the condensation product utilized as the emulsifier are simultaneously suitable as catalysts for the emulsified organopolysiloxanes, so that it is unnecessary to add a separate curing catalyst. A remarkable property of the emulsions prepared in accordance with this invention further resides in that the same are compatible with the conventional hardenable synthetic resins, namely the methylol compounds of ureas, alkylene ureas, melamine, and others, and with the simultaneously utilized curing catalysts.

Without further elaboration, it is believed that one skilled in the art can, using the preceding description, utilize the present invention to its fullest extent.

EXAMPLE 1

A solution of 128 g. of a methyl hydrogen polysiloxane (viscosity at 20° C.; 50 cp.) in 122 g. of perchloroethylene is stirred into 160 g. of an aqueous solution, the production of which will be described below. Thereafter, this preliminary emulsion is diluted with 340 ml. of water, the pH thereof is adjusted to 2.2 with hydrochloric acid, and the entire mixture is homogenized. During this process, a very finely divided, thinly fluid opalescent emulsion is obtained which can be stored unchanged over a period of more than 6 months.

The above-mentioned aqueous solution is prepared by heating under reflux and under agitation 35 g. of a 4,4'-dihydroxydiphenylpropane glycidyl ether (epoxy number 0.44), 4 g. of cyanamide, 15 g. of triethanolamine, and 12 g. of isobutanol, for 35 minutes. Thereafter, the reaction is stopped by the addition of a mixture of 20 g. of 60 percent acetic acid and 450 g. of water, and a clear to opalescent solution, pH=4.4, is obtained.

EXAMPLE 2

335 g. of an aqueous condensate solution, the production of which will be described in greater detail below, is stirred together with 300 g. of a copolymer of methyl hydrogen siloxane and dimethyl siloxane, 80:20 (viscosity at 20° C.: 180 cp.) and 25 g. of Formalin, 40 percent by volume, and 40 g. of tetrachloroethylene, as well as 300 g. of water; the pH is adjusted to 2.5 with concentrated hydrochloric acid, and the entire mixture is homogenized in a high pressure homogenizer. The emulsion thus obtained is extremely finely divided and stable and can be used after being diluted with water, for rendering fibrous materials hydrophobic.

The aqueous preliminary condensate solution employed is produced by heating, in a 500 ml. three-necked flask, with agitation, 60 g. of a diglycidyl ether of polyethylene glycol 200, 4 g. of cyanamide, 16.4 g. of diethanolisopropanolamine, and 12 g. of n-butanol, to 120° C. and, after obtaining a clear, strongly viscous mixture, diluting same by the addition of acetic acid and water to a 14 percent solution having a pH of 4.5.

EXAMPLE 3

By means of a high speed agitator, 280 g. of a condensate solution described hereinbelow is mixed with 130 g. of a methyl hydrogen polysiloxane (80 cp. at 20° C.), which later is dissolved in 120 g. of toluene, 20° C.), which later is dissolved in 120 g. of toluene, centrated nitric acid, and the preliminary emulsion thus obtained is homogenized at about 250 atmospheric excess pressure in a high pressure homogenizer for 45 minutes.

The solution of the condensation product employed herein is prepared by refluxing, for about 90 minutes, 80 g. of an organopolysiloxane diglycidyl ether of the formula

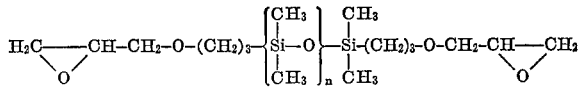

wherein $n$ is, on the average, about 10 (epoxy number 0.193), 8.5 g. of dicyandiamide, and 10 g. of ethanoliso- propanolamine, in the presence of 18 g. of isopropanol; after a marked increase in viscosity, this mixture is made into a 15 percent solution of a pH of 4.3 by the addition of acetic acid and water.

EXAMPLE 4

160 g. of an aqueous solution, the preparation of which will be described below, is heated to 70° C. and intimately mixed with an equally warm mixture of 260 g. of paraffin (M.P. 52–54° C.) and 70 g. of perchloroethylene, and treated in a high pressure homogenizer. Thereafter, a solution of 6 g. of 60 percent acetic acid in 160 ml. of water. warmed to 70° C., is added to the homogenized mixture, and the emulsion is agitated in the cold state. The emulsion thus obtained remains stable over a longer period of time, can be diluted with water in any desired proportion, and can be employed for rendering textiles, for example, water-repellent.

The preliminary condensate solution employed is prepared by heating, under reflux, 11 g. of glycerin diglycidyl ether, 6 g. of urea, 1.83 g. of monoethanolamine, and 6 g. of butanol, under agitation, to 125° C.; after about 15 minutes, the reaction is stopped by the addition of such an amount of hydrochloric acid and water that a 15 percent almost clear, colorless solution is obtained having a pH of 5.0.

EXAMPLE 5

195 g. of paraffin (M.P. 52–54° C.) is melted together with 35 g. of montanic acid (acid number 125) and 100 g. of toluene; this solution, having a temperature of about 70° C., is mixed, by means of a high speed agitator, with 180 g. of a likewise 70° C. aqueous solution, the preparation of which will be described below. Then, the mixture is homogenized and subsequently a solution of 3 ml. of formic acid in 260 ml. of water is added thereto with stirring. The finely divided emulsion thus obtained is extremely stable in the concentrated condition as well as after the dilution with water.

The above-employed aqueous preliminary condensate solution is produced by refluxing 43 g. of the glycidyl ether of 4,4'-dihydroxydiphenylmethane (epoxy number 0.43), 8.6 g. of ethylene urea, and 25 g. of triisopropanolamine, in the presence of 22 g. of isobutanol, under agitation for about 25 minutes. After a marked increase in viscosity, the reaction is stopped by the addition of acetic acid and water, whereby an 11 percent solution is obtained having a pH of 4.6.

EXAMPLE 6

A stable emulsion is produced by intimately stirring together 546 g. of a solution, heated to 50° C., the preparation of which is described in Example 1, with a mixture, having a temperature of about 75° C., of 500 g. of chlorinated paraffin (chlorination degree 40 percent), 76 g. of chlorinated rubber, 66 g. of pentachlorophenol-fatty acid ester (fatty acid mixture of 8–14 carbon atoms), 70 g. of toluene, 72 g. of turpentine, and 274 g. of tetrachloroethylene, as well as 396 g. of water; the entire mixture is then homogenized at 50° C. The emulsion thus obtained can be employed for flameproofing; in this connection it is possible to additionally include in the emulsion approximately 390 g. of finely powdered antimony oxide.

EXAMPLE 7

By means of a high speed agitator, a solution of 192 g. of polyethylene wax (molecular weight about 2100, softening point about 87° C., acid number about 25, saponification number about 50, and specific gravity about 0.94) in 528 g. of tetrachloroethylene is stirred together with 500 g. of a solution, the preparation of which is described in Example 2, wherein both solutions are heated to about 75° C. The preliminary emulsions thus obtained is homogenized, after the addition of 240 ml. of a 3 percent formic acid (temperature: 70° C.) at about 55° C.

in a high pressure homogenizer at 250 atmospheric excess pressure for 45 minutes. The emulsion thus obtained is stable and can be diluted with water as desired.

EXAMPLE 8

155 g. of the emulsified solution prepared as described hereinbelow is provided, and a solution of 30 g. of 2,4,4'-trichloro-2'-hydroxydiphenyl ether, in a mixture of 15 g. of perchloroethylene and 50 g. of toluene, and 645 g. of water are vigorously stirred together therewith; the entire mixture is homogenized at 20–30° C. and under 250 atmospheric excess pressure. The emulsion thus obtained can be employed for rendering material bacteriostatic.

The aqueous preliminary condensate solution employed is prepared by refluxing 300 g. of a glycidyl ether of glycol (epoxy number 0.57), 190 g. of benzoguanamine and 59.5 g. of N-methyldiethanolamine, in the presence of 160 g. of propanol. After a marked increase in viscosity the reaction is stopped by the addition of formic acid and water, thus obtaining a 10 percent opalescent solution having a pH of 4.8.

EXAMPLE 9

280 g. of solution, the preparation of which will be described below, is diluted with 250 g. of water, and under vigorous agitation, 130 g. of silicon dioxide (particle size about 30 mμ, surface about 170 m.²/g.) is added thereto. During the addition of silicon dioxide, another 340 g. of water in total are stirred into the mixture. Finally, the emulsion is subjected to a further homogenization at 20° C. for 30 minutes in a high pressure homogenizer under 220 atmospheric excess pressure. The thus obtained dispersion is excellently suitable for imparting nonslip properties, simultaneously being obtained a more pleasant handle. It is especially advantageous that organo polysiloxanes can be emulsified simultaneously and therefore a simultaneous non-slipping and water repellent finishing of fiber materials is possible.

The aqueous preliminary condensate solution employed is prepared by refluxing 220 g. of the glycidyl ester of adipic acid (epoxy number 0.5), 42 g. of cyanamide, and 149 g. of triethanolamine in the presence of 100 g. of isobutanol; after an increase in viscosity, the reaction is stopped by the addition of acetic acid and water, thus obtaining an 8 percent, slightly opalescent solution having a pH of 4.8.

EXAMPLE 10

125 g. of a condensation product solution, the preparation of which is described in Example 1, is stirred together with 400 g. of a 30 percent solution of cellulose acetate suitable for lacquers in methylcyclohexanone and homogenized after the addition of 200 ml. of a 4 percent acetic acid.

EXAMPLE 11

1500 g. of pentachlorophenol-lauric acid ester are melted, mixed with 500 g. of toluene, and intimately stirred, at 70° C., together with 250 g. of the solution described in Example 5, which was likewise heated to 70° C. This mixture is homogenized by means of a high pressure emulsifying machine and diluted with 2 liters of water containing 20 ml. of 60 percent acetic acid. The tube obtained emulsion is very finely divided and stable and can be diluted with water. This emulsion is very well suited for the impregnation of organic materials in order to render same rotproof.

In the same manner, 1.5 kg. of linseed oil can likewise be processed into a stable emulsion.

EXAMPLE 12

280 g. of a solution described in greater detail below and 460 g. of a solution of 100 g. of Product C disclosed in column 4 of U.S. Pat. 3,380,943, 100 g. of methyl ethyl ketone, and 260 g. of tetrachloroethylene are stirred together by means of a high speed agitator. This mixture is treated on a high pressure homogenizer and replenished with water to a volume of 1000 g. The stable and finely divided emulsion thus obtained, which can be diluted with water to an unlimited extent, is well suited, for example, to render paper oil repellent.

The aqueous preliminary condensate solution employed is prepared by stirring 66 g. of a glycidyl ether of resorcinol (epoxy number 0.8), 85 g. of dicyandiamide, 146 g. of butylamine, and 100 g. of glycol monoethyl ether under reflux until the reaction mixture has become practically clear and a marked increase in viscosity can be observed (about 1½ hours). Thereafter, the reaction is stopped by the addition of propionic acid and water (pH=5.5) and adjusted to a concentration of 10 percent.

EXAMPLE 13

A mixture of 140 g. of the condensate solution prepared in accordance with Example 1, 200 g. of water, and 60 g. of 60 percent acetic acid is heated to 80° C.; a melt, likewise at a temperature of 80° C., of 140 g. of paraffin (M.P. 58–60° C.), 21 g. of montan wax (acid number about 30, saponification number=135–150) and 7 g. of montan wax (acid number about 130, saponification number=155–175), as well as a solution of a temperature of 80° C. of 72 g. of zirconium acetate (about 25 percent ZrO₂) and 74 g. of urea in 286 g. of water are added thereto, and the entire mixture is homogenized at a temperature of 60° C. and a pressure of 300 atmospheric excess pressure. The emulsion thus obtained represents an excellent agent to render material hydrophobic.

We claim:

1. In a process for the preparation of aqueous emulsions and dispersions of water-insoluble liquid, pasty, and solid organic and inorganic substances, the improvement comprising carrying out the emulsification with emulsifiers comprising water-soluble or water-self-dispersing condensation products which cross-link with heating by reacting with heating a mixture consisting of:
   (a) about 1 mole of a compound selected from the group consisting of urea, guanidine, acetoguanidine, cyanamide, dicyandiamide, melamine, alkyl guanamines, ethylene urea, propylene urea, biuret, thiourea, dihydroxyethylene urea, oxypropylene urea. N-methylurea, N,N'-diethylurea, aminoguanidine and arylguanamines:
   (b) about 0.25–2.5 moles of an epoxy resin compound containing in the molecule on the average more than one epoxy group and having an epoxy number of from 0.19 to 0.85;
   (c) about 0.1–2 moles of an amine of the general formula

wherein $R_1$ is an alkyl group having 2–4 carbon atoms or an alkanol having 2–5 carbon atoms, $R_2$ and $R_3$ are independently selected from hydrogen, an alkyl group having 1–4 carbon atoms or an alkanol having 2–5 carbon atoms and said amine of the general formula has at least 2 reactive hydrogen atoms present in the molecule and terminating the reaction by the addition of a volatile acid and water.

2. The process of claim 1, wherein the condensation reaction is carried out in the presence of a water-miscible solvent having a boiling point above approximately 50° C.

3. The process of claim 2, wherein about 1 mole of component (a) is reacted with about 0.5–1.5 moles of component (b) and about 0.3–1.2 moles of component (c).

4. The process of claim 3, wherein component (a) is selected from the group consisting of cyanamide and dicyandiamide; component (b) is selected from the group consisting of glycidyl ether of 4,4'-dihydroxydiphenylpropane, glycerine and ethylene glycol, glycidyl esters of dicarboxylic acids and mixtures thereof; and component (c) is selected from the group consisting of trialkanolamines and N-alkyl dialkanolamines.

5. In an aqueous emulsion or dispersion of water-insoluble liquid, pasty and solid organic and inorganic substances, the improvement comprising an emulsifier of water-soluble or water-self-dispersing condensation products which cross-link with heating, said emulsifier consisting essentially of the heat reaction products of a mixture consisting of:
(a) about 1 mole of a compound selected from the group consisting of urea, guanidine, acetoguanidine, cyanamide, dicyandiamide, melamine, alkyl guanamines, ethylene urea, propylene urea, biuret, thiourea, dihydroxyethylene urea, oxypropylene urea, N-methylurea, N,N'-diethyl urea, aminoguanidine and arylguanamines;
(b) about 0.25–2.5 moles of an epoxy resin compound containing in the molecule on the average more than one epoxy group and having an epoxy number from 0.19 to 0.85; and
(c) about 0.1–2 moles of an amine of the general formula

wherein $R_1$ is an alkyl group having 2–4 carbon atoms or an alkanol having 2–5 carbon atoms, $R_2$ and $R_3$ are independently selected from hydrogen, an alkyl group having 1–4 carbon atoms or an alkanol having 2–5 carbon atoms and said amine of the general formula has at least 2 reactive hydrogen atoms present in the molecule.

6. The aqueous emulsion or dispersion of claim 5, wherein about 1 mole of component (a) is reacted with about 0.5–1.5 moles of component (b) and about 0.3–1.2 moles of component (c).

7. The process of claim 3, wherein component (a) is aryl guanamines.

8. The process of claim 3, wherein component (a) is alkyl guanamines.

References Cited
UNITED STATES PATENTS

| | | | |
|---|---|---|---|
| 2,723,241 | 11/1955 | De Groote et al. | 260—47 |
| 3,335,105 | 8/1967 | Burnthall et al. | 260—47 |
| 3,456,035 | 7/1969 | Enders et al. | 260—47 |

DONALD J. ARNOLD, Primary Examiner

A. H. KOECKERT, Assistant Examiner

U.S. Cl. X.R.

117—142, 155 R; 252—311, 312, 313; 260—13, 18 EP, 28, 29.2 M, 29.4, 29.6 PM, 37 EP